US006915813B2

(12) United States Patent
Kobes

(10) Patent No.: US 6,915,813 B2
(45) Date of Patent: Jul. 12, 2005

(54) CHECK VALVE

(75) Inventor: Frederick Kobes, Mount Gambier (AU)

(73) Assignee: Hydro-Flo Holdings PTY LTD, Mount Gambier (AU)

( * ) Notice: Subject to any disclaimer, the term of this patent is extended or adjusted under 35 U.S.C. 154(b) by 0 days.

(21) Appl. No.: 10/708,894

(22) Filed: Mar. 30, 2004

(65) Prior Publication Data

US 2004/0182438 A1 Sep. 23, 2004

Related U.S. Application Data

(63) Continuation of application No. PCT/AU02/01336, filed on Oct. 2, 2002, now abandoned.

(30) Foreign Application Priority Data

Oct. 2, 2001 (AU) .............................................. PR7988

(51) Int. Cl.[7] .............................................. F16K 15/02
(52) U.S. Cl. ...................................... 137/220; 137/538
(58) Field of Search ................................. 137/220, 538, 137/543.23

(56) References Cited

U.S. PATENT DOCUMENTS

| | | | | |
|---|---|---|---|---|
| 502,252 A | * | 7/1893 | Hanna .................... | 137/543.23 |
| 2,206,356 A | * | 7/1940 | Hutchings ................... | 137/538 |
| 2,538,364 A | * | 1/1951 | James et al. ................ | 137/540 |
| 2,633,147 A | * | 3/1953 | Badami ...................... | 137/538 |
| 2,928,417 A | * | 3/1960 | Buckner et al. ............ | 137/538 |
| 2,960,998 A | * | 11/1960 | Sinker et al. .......... | 137/543.23 |
| 3,565,100 A | * | 2/1971 | Pfleger .................. | 137/543.23 |
| 3,943,969 A | * | 3/1976 | Rubin et al. ................ | 137/538 |

OTHER PUBLICATIONS

International Search Report for PCT/AU02/01336.

International Preliminary Examination Report for PCT/AU02/01336.

* cited by examiner

Primary Examiner—Gerald A. Michalsky
(74) Attorney, Agent, or Firm—Dalina Law Group P.C.

(57) ABSTRACT

A check valve including an outer body having a cylindrical inner bore and a shuttle within the inner bore which is arranged with an upstream, middle and downstream portion that each engage with a sliding fit the inner bore of the outer body being such that, when in a closed position, the middle portion engages with a flexible seal a sealing engagement the inner bore and when in an open position it is arranged that the liquid will flow through a passage around the middle portion which passage includes at the least a path through the outer body.

12 Claims, 11 Drawing Sheets ized turbulence within the vicinity of such devices

CHECK VALVE

This application is a continuation of International Application PCT/AU02/01336, with an international filing date of Oct. 2nd, 2002, published in English under PCT Article 21(2) and now abandoned, which is a Paris Convention filing of Australian Application PR 7988 having a priority date of Oct. 2nd, 2001. International application PCT/AU/01336 and Australian application PR 7988 are hereby incorporated herein by reference.

BACKGROUND OF INVENTION

1. Field of the Invention

Embodiments of the invention described herein pertain to the field of valves. More particularly, embodiments of the invention relate to check valves. Historically, check valves have used clackers or poppets within a body through which the liquid will flow to effect closure of the valve.

2. Description of the Related Art

Both the shape and location of such a clacker or poppet previously used has hitherto meant that there is potentially significant turbulence within the vicinity of such devices when they are in an open position, and any such turbulence will cause potential vibration and rotational relative movement.

Techniques which have hitherto been tried include adding a stem to the clacker or poppet which is located and held within a spider within the body where the spider provides a central aperture through which the stem of the clacker or poppet might be retained.

Attempts have been made to stop rotational movement by having the stem have a non-circular cross sectional shape and this shape matching a similarly shaped aperture through the center of the spider.

Unfortunately, over time, such a combination is very vulnerable to serious failure.

Such a problem is especially of concern when the check valve is at a discharge end of an electric submersible pump such as those used in deep well pumping operations.

Two major problems occur when a check valve fails in this situation, namely when the discharge outlet gets blocked off, the pressure created in the pump is not registered by a pressure switch at a head of the well, so that the pump then will run continuously until burn out or fusion occurs.

A second problem occurs when the valve clacker does not return properly.

This can be as a result of mechanical malfunction or it can be as a result of impurities or sediment within the liquid, such as water, that is being pumped.

Leakage resulting from this will cause the pressure switch to restart the pump because of the pressure drop.

Such a restart often engages while the electric motor is running in reverse at high speed, brought on by a turbine action of the quickly returning water through the pump.

A restart at this point will result in burn out because an overload will drop out too late.

Burn out costs of these pumps is very high indeed.

Further, because such submersible pumps might be anything from 100 to 1000 meters underground, it can take many days to retrieve the pump and check valve in order to perform a replacement or repair.

While this is one illustration of a problem, check valves generally have high failure rates in other applications such as industrial applications and are currently a major cause of production loss.

Failure typically will cause a shut down of a production process while it is replaced.

The problem addressed by this invention then is to propose a check valve that, at the least, provides for an improved reliability in use, or at the least, provides the public with a useful alternative.

SUMMARY OF INVENTION

In one form then, although this need not necessarily be the only or indeed the broadest form of this, there is proposed a check valve including an outer body having an inner bore, and a shuttle arranged within the inner bore to move relative to the inner bore between a closed checking position locking flow of liquid through the valve, and an open position allowing for the flow of liquid through the valve, and a resilient means biasing a position of the shuttle toward said closed position, characterized in that the shuttle has a downstream portion, an upstream portion and a middle portion, each portion engaging with a sliding fit the inner bore and such that, when in a closed position, the middle portion engages with a sealing engagement, the inner bore.

In the alternative, and in preference, there is a check valve including an outer bore having an inner bore and a shuttle arranged within the inner bore to move relative to the inner bore between a closed checking position locking fluid of liquid through the valve, and an open position allowing for flow of liquid through the valve, and a resilient means biasing the position of the shuttle towards said closed position, characterized in that the shuttle has a downstream portion, an upstream portion and a middle portion, each portion engaging or engageable with a sliding fit be in a bore of the outer body and being such that, when in a closed position, the middle portion engages with a flexible seal, a sealing engagement of the inner bore.

In preference, in both of the above cases, these are further characterized in that, when the shuttle is in an open position, flow of liquid is directed through a passage which first is through the shuttle, then through the outer body, and then through the shuttle to an outlet end of the body.

In a further alternate form, the invention can be said to reside in a check valve including an outer body having an inner bore and a shuttle arranged within the inner bore to move relative to the inner bore between a closed checking position blocking flow of liquid through the valve, and an open position allowing for flow of liquid through the valve, and a resilient means biasing the position of the shuttle towards said closed position, characterized in that the shuttle has a downstream portion, an upstream portion and a middle portion, each portion engaging or engageable with a sliding fit of the inner bore of the outer body and being such that, when in a closed position, the middle portion engages with a flexible seal, the sealing engagement of the inner bore and, when in an open position, arranged that the liquid will flow around the middle portion.

In a further alternative arrangement, there is provided a check valve including an outer body having an inner bore and a shuttle arranged within the inner bore to move relative to the inner bore between a closed checking position blocking flow of liquid through the valve, and an open position allowing for flow of liquid through the valve, and a resilient means biasing the position of the shuttle toward the said closed position, characterized in that the shuttle has a downstream portion, an upstream portion and a middle portion, each portion engaging or engageable with a sliding fit, the inner bore of the outer body and being such that, when in a closed position, the middle portion engages with a flexible seal, a sealing engagement the inner bore and when in an open position it is arranged that the liquid will flow through a passage around a middle portion which passage includes at least a path through the outer body.

In an alternative arrangement, there is provided a check valve including an outer body having a cylindrical inner bore, and a shuttle arranged within the inner bore to move relative to the inner bore, and adapted to move between a closed checking position blocking flow of liquid through the valve, and an open position allowing for the flow of liquid through the valve, and a helical spring comprising resilient means, biasing the position of the shuttle towards said closed position, characterized in that the shuttle has a downstream portion, an upstream portion and a middle portion, each portion engaging or engageable with the sliding fit the inner bore of the outer body and being such that, when in a closed position, the middle portion engages with a flexible seal a sealing engagement the inner bore and when in an open position, it is arranged that the liquid will flow through a passage around the middle portion which passage includes at least a path through the outer body and where the passageway includes a central stream line alignment through the shuttle to the path through the outer body.

In preference, the flexible seal is held with respect to the shuttle.

In an alternative arrangement, the flexible seal is held with respect to the outer body.

In an alternative arrangement, the flexible seal is an O-ring.

In a further alternative arrangement, the flexible seal is a bucket seal.

In preference, through all of the previously described references to features, these are further characterized in that the arrangement is such that the flexible seal effects a sliding and therefore wiping action between the respective surfaces as it is urged into a closed position with respect to the valve of the body.

The advantage of this last feature is that by having the closing action result in the seal approaching with the sliding and therefore wiping action a seat, means that any debris or other residual materials that otherwise would sit on the seat, will have a high degree of potential of being removed by this action.

This is relevant where there is a high degree of sediment or particles within the liquid, such as water, which could otherwise quite reasonably settle upon a valve seat which is transverse to the flow of water and such that where the bore of the check valve is upright, will provide for realistic support face and therefore settlement of such particles.

If the seal is effected by previous technology such as a clacker, then it will sit directly onto the seat so that with deposited material still staying on this, it will not sit properly and therefore allow for either small or rapid leakage.

The further features described provide that the shuttle is supported by engaging surfaces which are generally at an outermost diameter of the shuttle in the case that the shuttle and the bore are of circular cross section.

This then provides firstly for substantial opportunity to provide for lateral stability because both the downstream and upstream ends can be held relatively firmly in a way that maximizes engaging positions while, at the same time, the flow of water bypassing the shuttle when it is in an open position passes through the shuttle to a pathway or passageway through the body then back through the shuttle to a downstream location.

Having a helical spring or other biasing means which are arranged to be closed and therefore not interfere with the flow when the shuttle is in a fully open position, is a further advantage.

Further, the streamline shaping within the shuttle do provide for maximum passage without turbulence of liquid past the shuttle is of significant advantage.

By using the passageway to incorporate the body itself means that there can be provided a passageway area that is substantially similar throughout the length of the pathway past the shuttle and this has significant advantages both in reducing turbulence and reducing back pressure.

BRIEF DESCRIPTION OF DRAWINGS

The invention will be better understood when described with relation to preferred embodiments which shall be described now with the assistance of drawings wherein.

DETAILED DESCRIPTION

Figure 1:
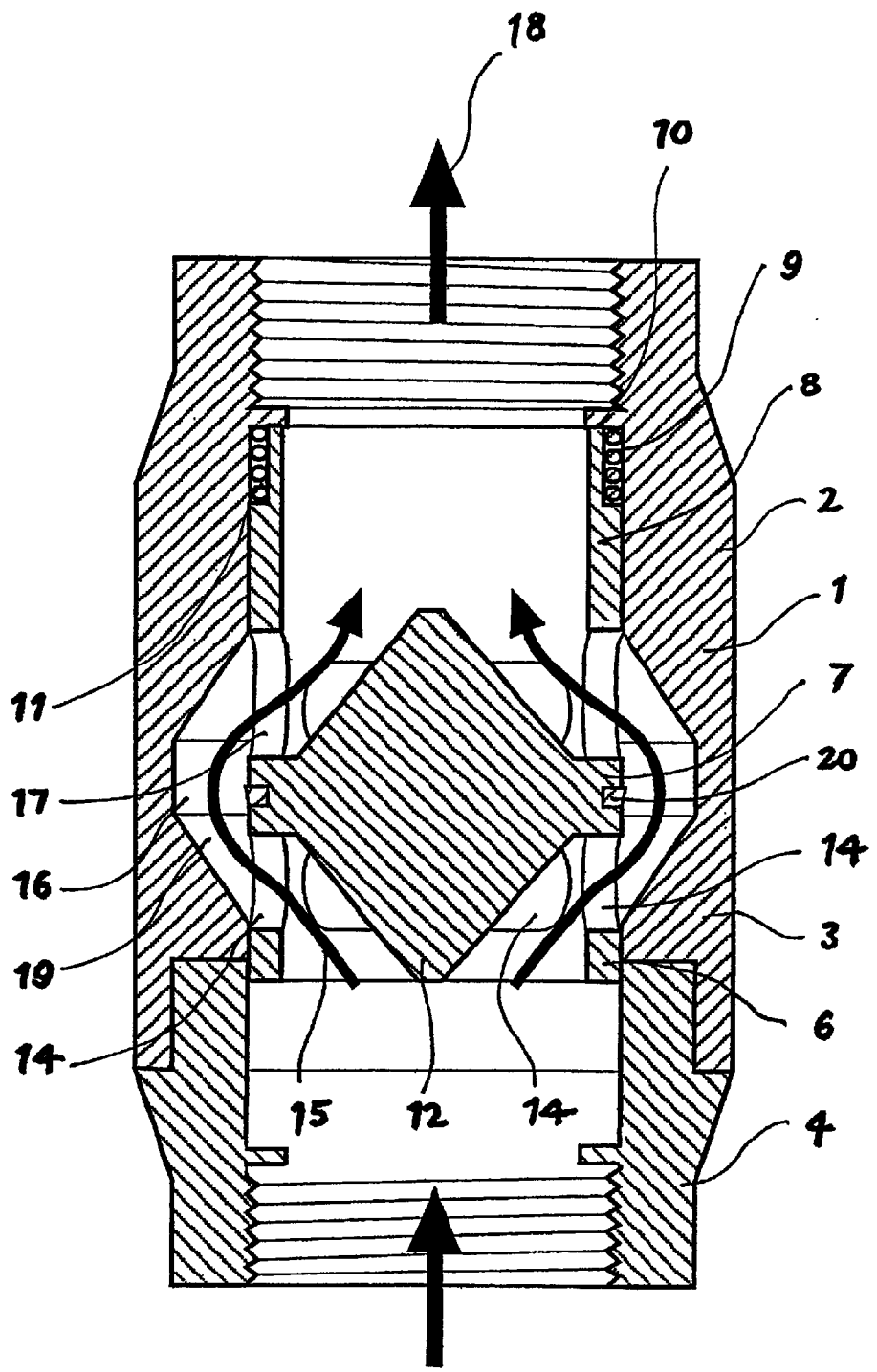
FIG. 1 is a cross sectional view of a check valve according to the first embodiment wherein there is provided a shuttle which is in an open position.

Referring now to the first embodiment as shown through FIGS. 1 to 5, there is a check valve 1 which includes a body 2 which has predominantly an inner bore which is of circular cross sectional shape and which includes two portions which is a main body portion 3 and an end portion 4 which is joined to the main body portion 3 by a screw thread which allows for access into the body for a shuttle 5.

Within the body 2 is the shuttle 5 which has a downstream portion 6, a middle portion 7 and an upstream portion 8.

Each of these portions is adapted to slide with freedom within the respective inner bore of the body 2.

Figure 2:
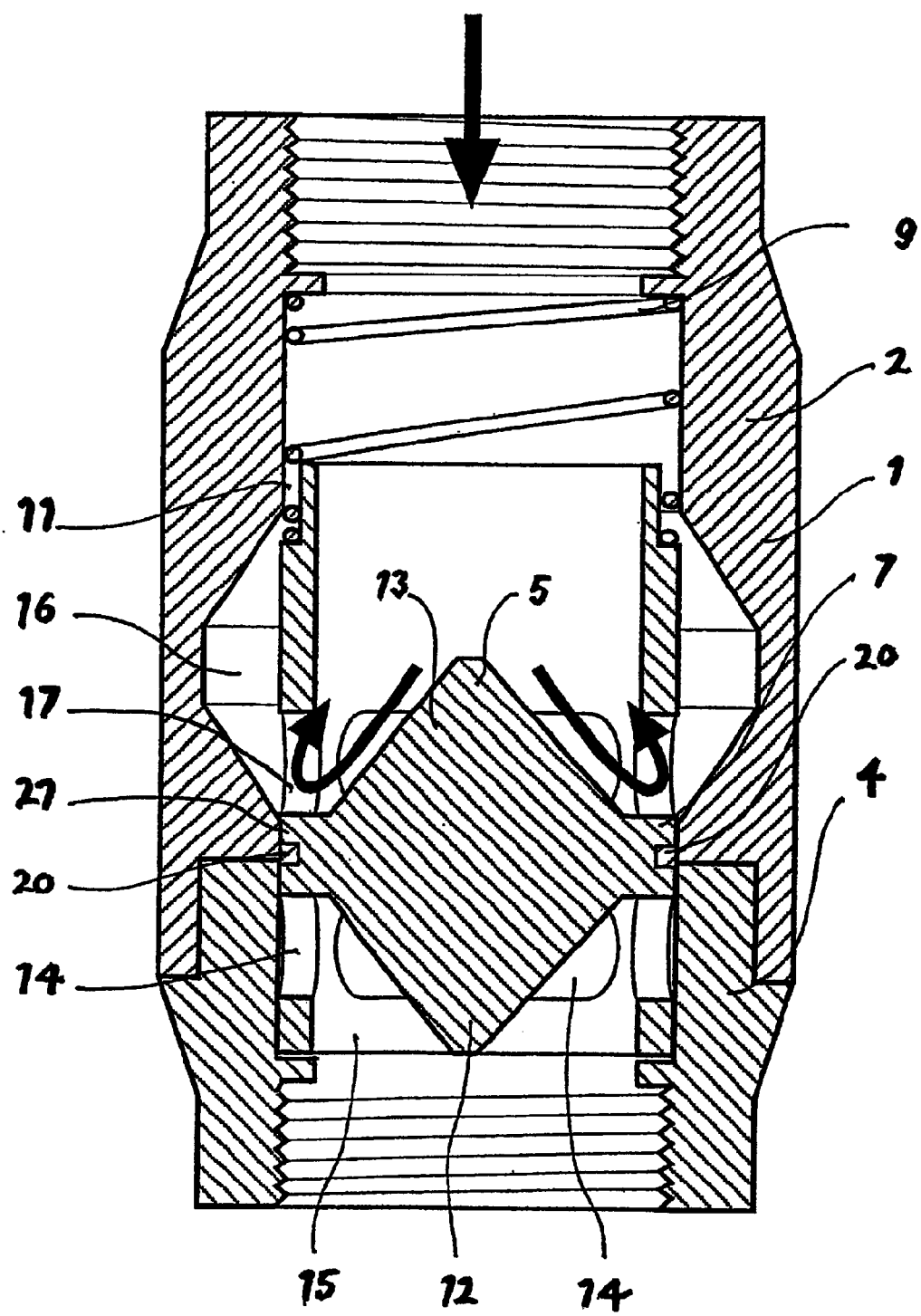
FIG. 2 is a cross sectional view of the same check valve as in FIG. 1 where, in this case, the shuttle is in a closed position.
Figure 3:
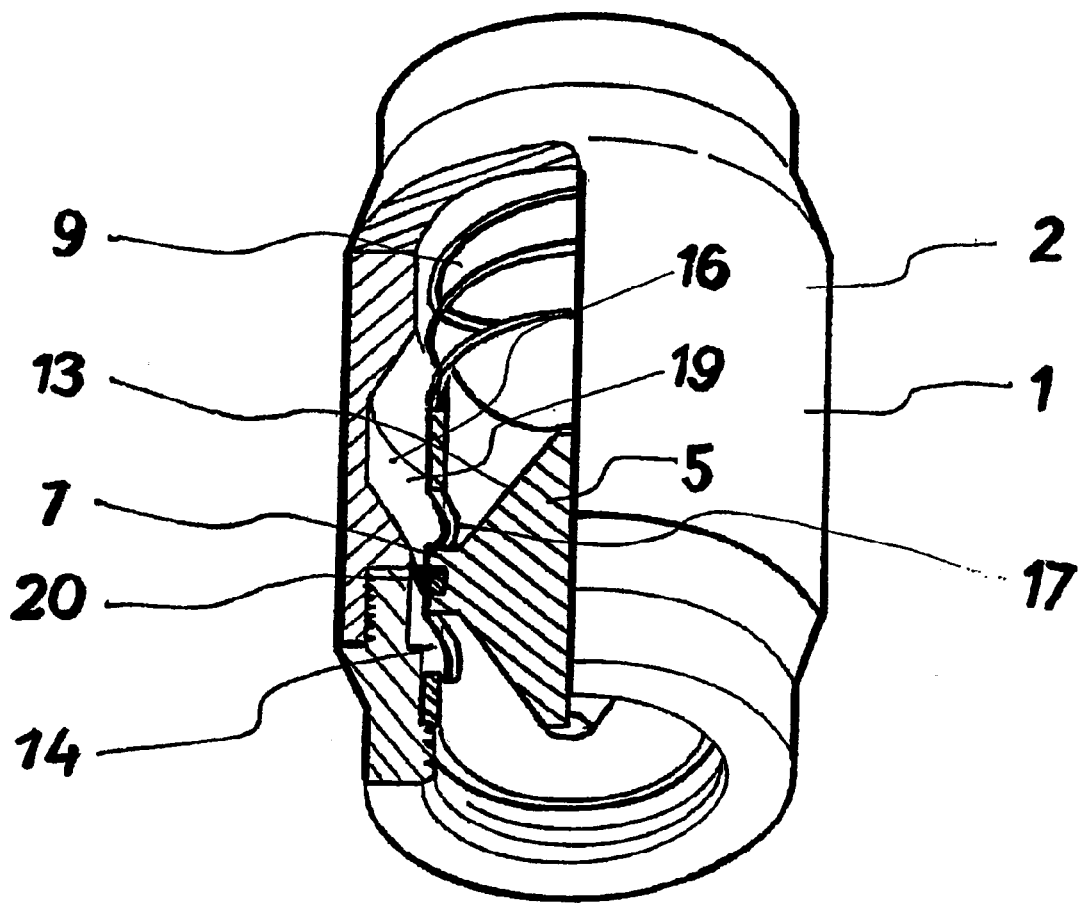
FIG. 3 is a part cut away in perspective of the check valve as in both FIGS. 1 and 2 when in a closed position as in FIG. 2.
Figure 4:
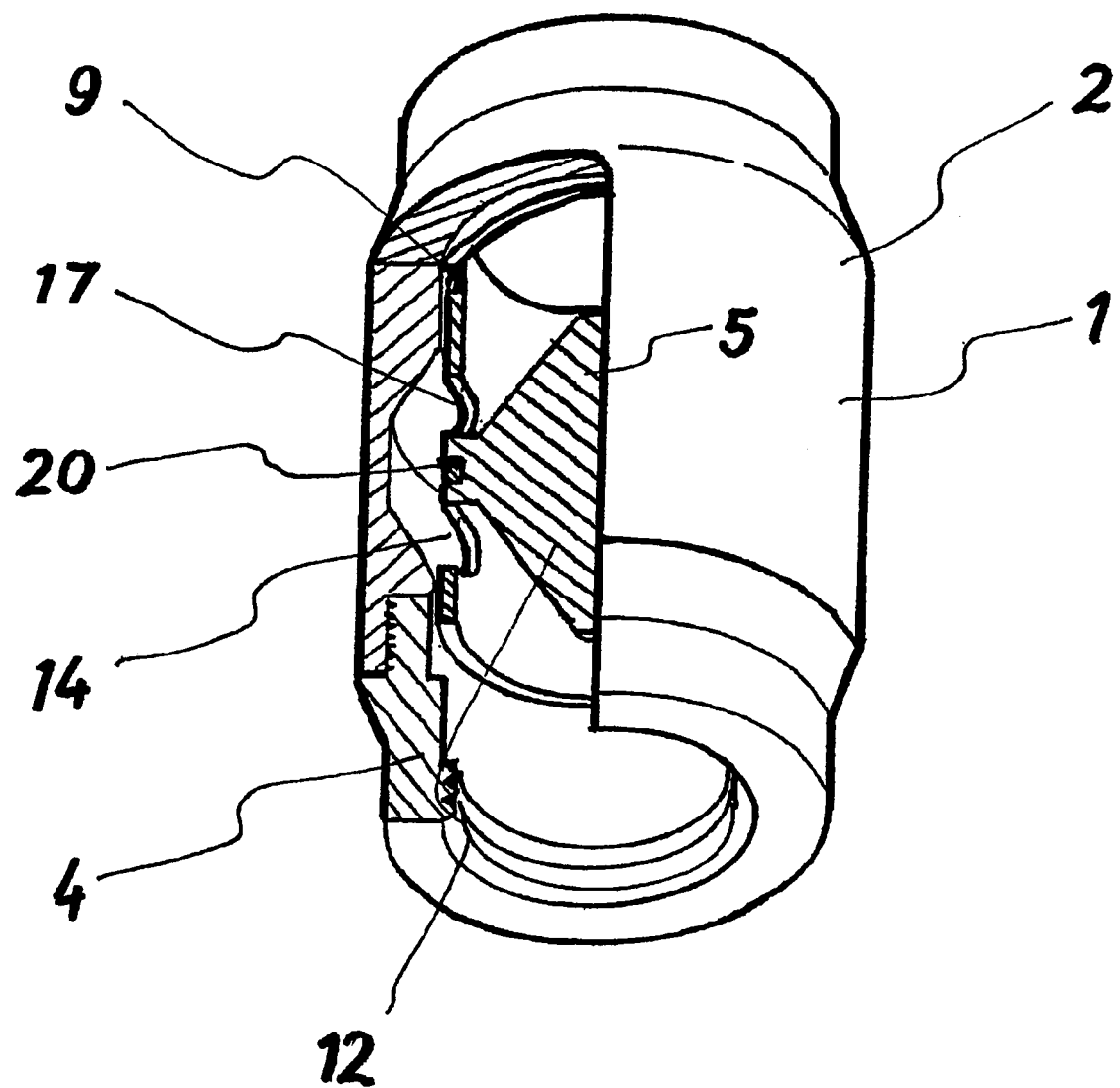
FIG. 4 is a perspective view with part cut away showing the check valve as in FIGS. 1 and 2 with the shuttle in an open position.
Figure 5:
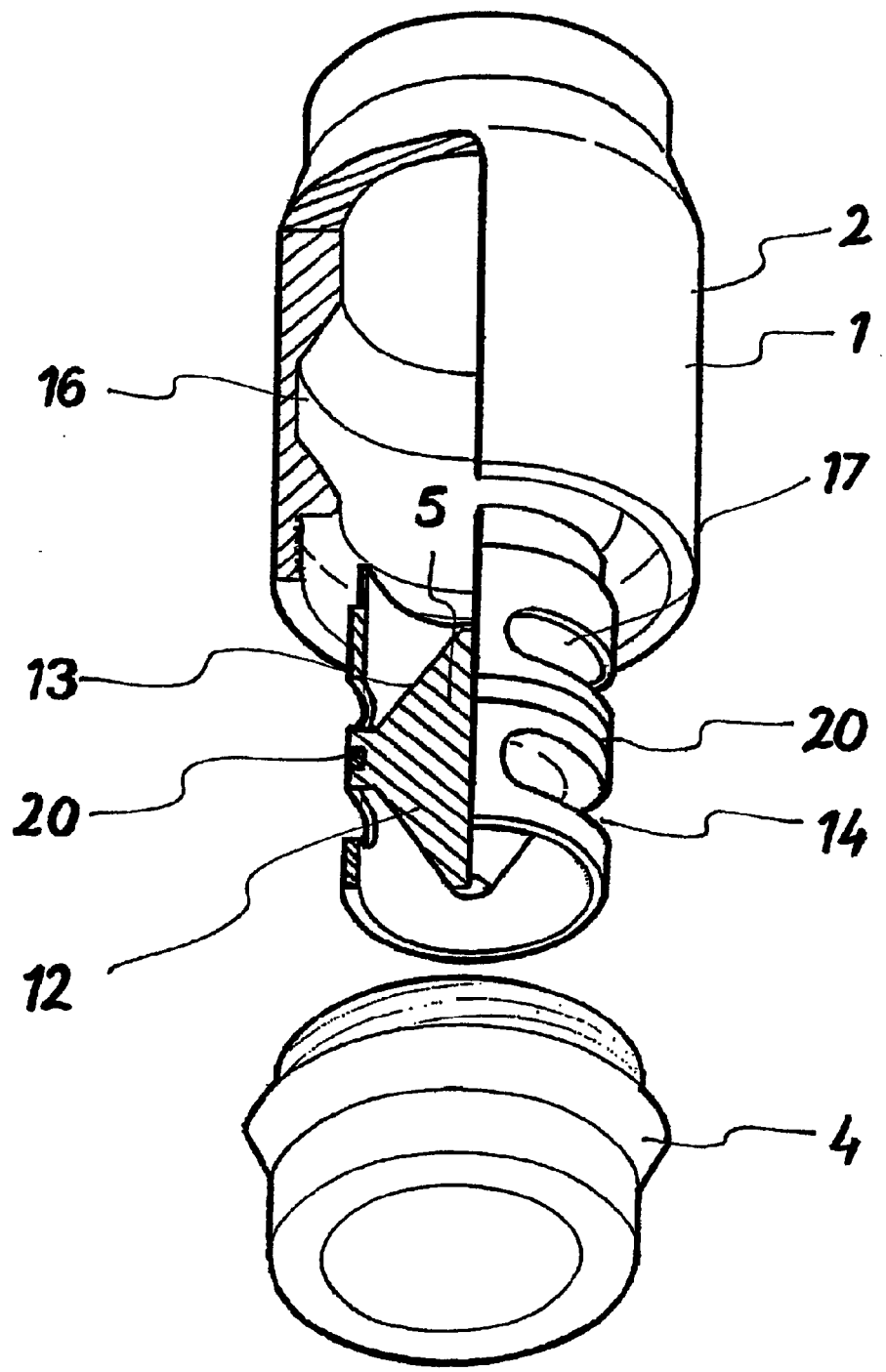
FIG. 5 is an exploded view of the parts forming the check valve except for the helical spring, this being the embodiment as shown in FIGS. 1 through 4.

In other words, the shuttle 5 can move between an open position as shown in FIG. 1 to a closed position as shown in FIG. 2 with relative sliding freedom biased, however, by reason of helical spring 9 which is held between stop 10 and the downstream portion 8 of the shuttle 5.

As can be seen, particularly in FIG. 1, when the shuttle 5 is in an open position, the helical spring can be captured within a gap area 11 which therefore minimizes the frictional resistance therepast and liquid passing by.

The shuttle itself includes a middle portion 7 which includes a downstream cone shaped portion 12 and an upstream cone portion 13.

Further, the shuttle includes apertures at 14 for liquid that might be passing by the shuttle so that it will enter into area 15 and then through aperture 14 to pass through passageway 16 through the body 2.

Such passage of liquid will then be able to pass back into the shuttle area through aperture 17 and then continue downstream as shown by arrow 18.

As can now be seen, particularly when the shuttle is in an open position, by appropriate shaping and sizing of both the apertures 14 and there are several of these around the diameter of the shuttle, and by appropriate sizing and location of the passageway 16 through the body, which includes a central part 19 and both leads in and leads out of this, the actual cross sectional area available for the passage of liquid (which will be typically water), will be significant and can be selected so that this can be similar to the passageway area (the cross sectional area) of the main bore of the body 2.

The shuttle at a middle portion 7 includes a bucket seal 20.

Referring specifically to FIG. 2, it will be seen that when the shuttle 5 is in a closed position, the seal 20 is in an engaging position with respect to the inner bore of the body 2.

As the shuttle 5 is moved to this position, it will be seen that it engages the shoulder 21 of the inner bore of the body 2 and by reason of the relative shaping of these several parts, and the fact that the shuttle 5 is constrained to act and move only parallel to the bore of the body 2, this means that the seal 20 when it engages the inner surface will cause this to be a wiping and therefore self cleansing effect.

Figure 8:
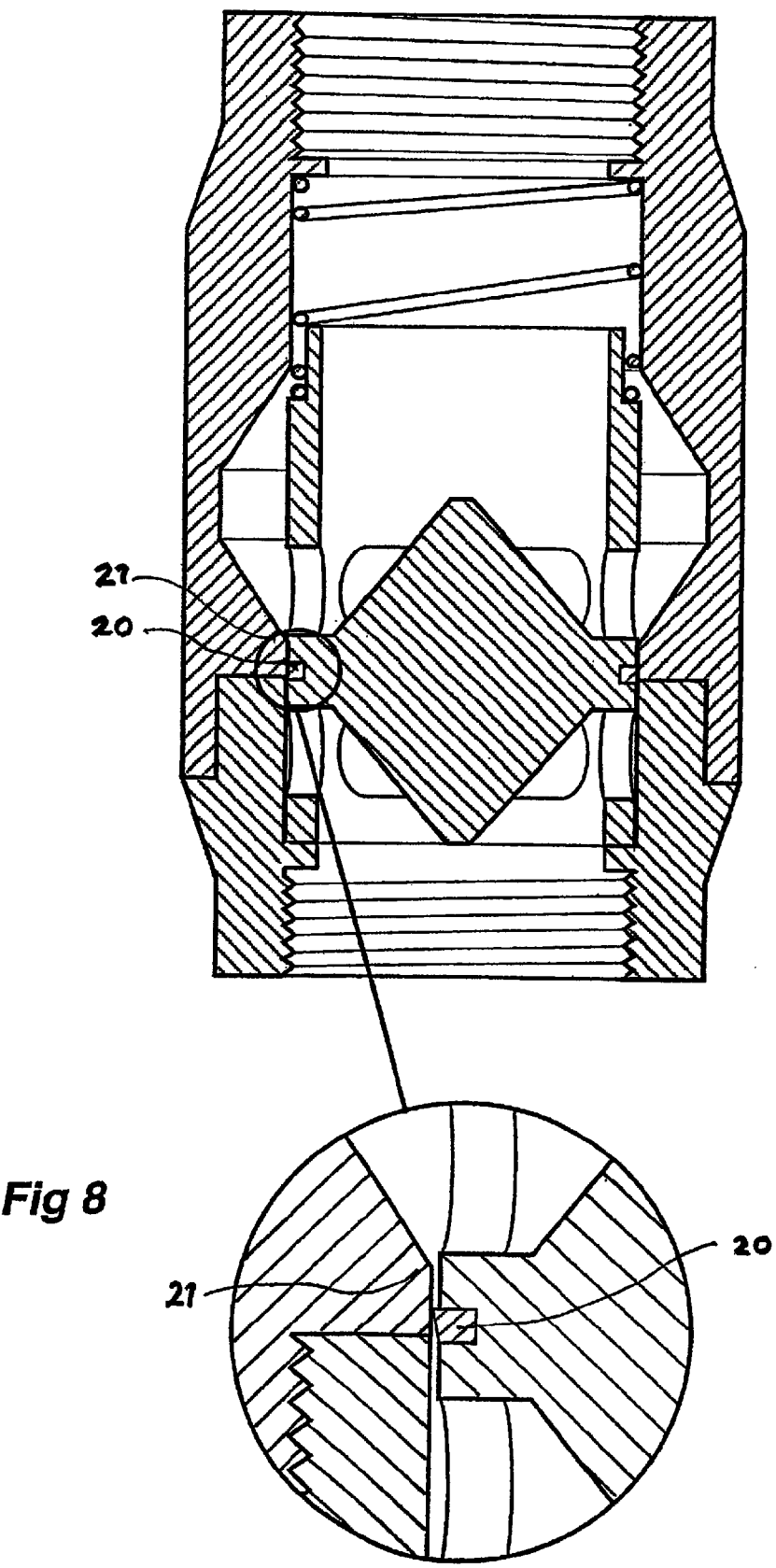
FIG. 8 is a cross sectional view of the same check valve as in FIG. 2 where, in this case, a detail view of the bucket seal 20 and its relationship with shoulder 21 is included.

Referring to FIG. 8, it can be seen that as the shuttle 5 is moved to the closed position, the bucket seal 20 is orientated such that a simultaneous wiping and wedging action takes place as the bucket seal comes into contact with the shoulder 21.

There is also, no transverse past here that will cause the seal not to seat properly and therefore allow for leakage.

In this particular case, it will be seen that the helical spring 9 is expanded so as to effect the biasing in position of the shuttle 5 to the sealed position as shown in FIG. 2.

Figure 6:
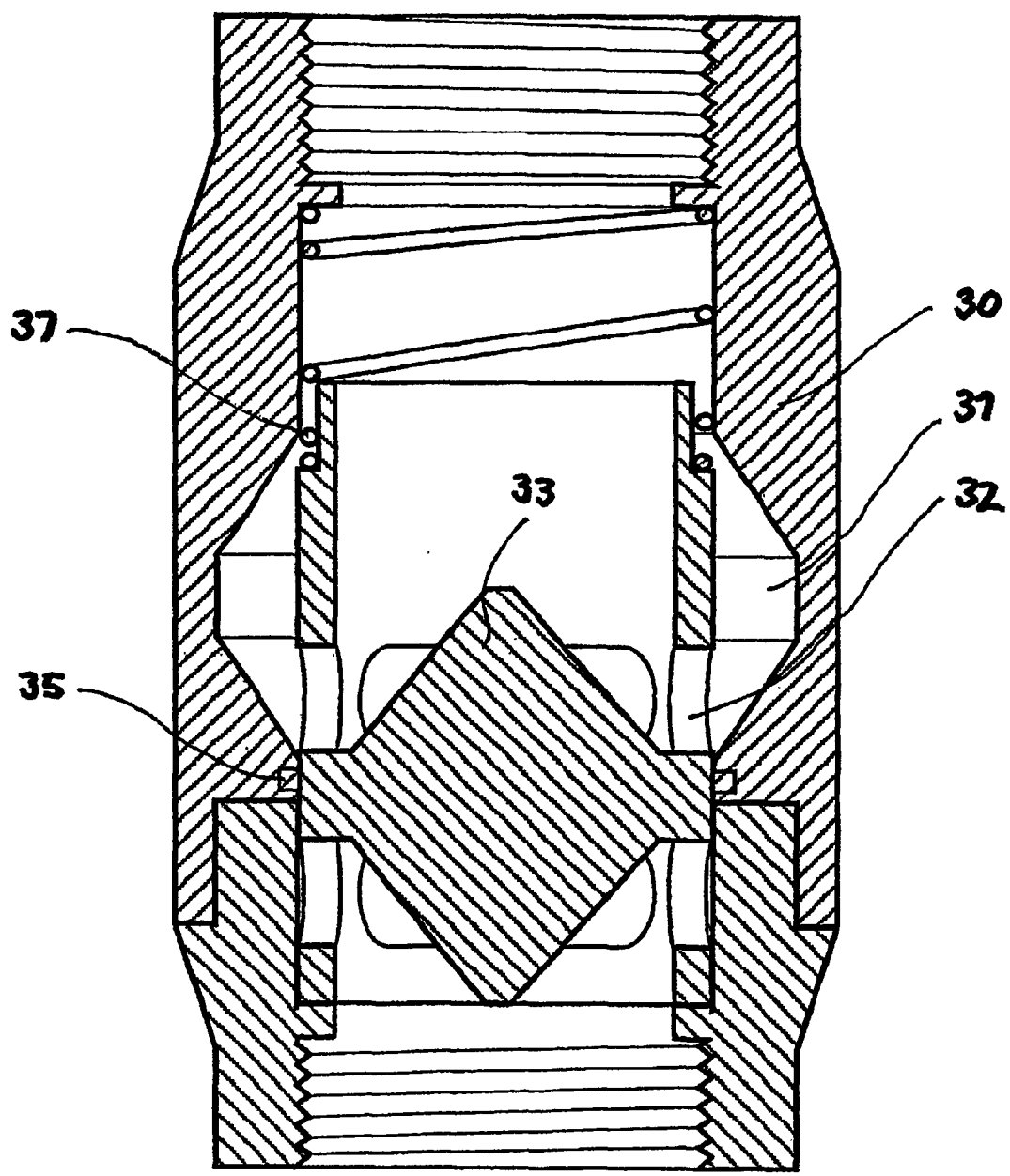
FIG. 6 is a cross sectional view of a check valve according to a second embodiment in which the seal is positioned with respect to the body, this showing the position in a sealed position.
Figure 7:
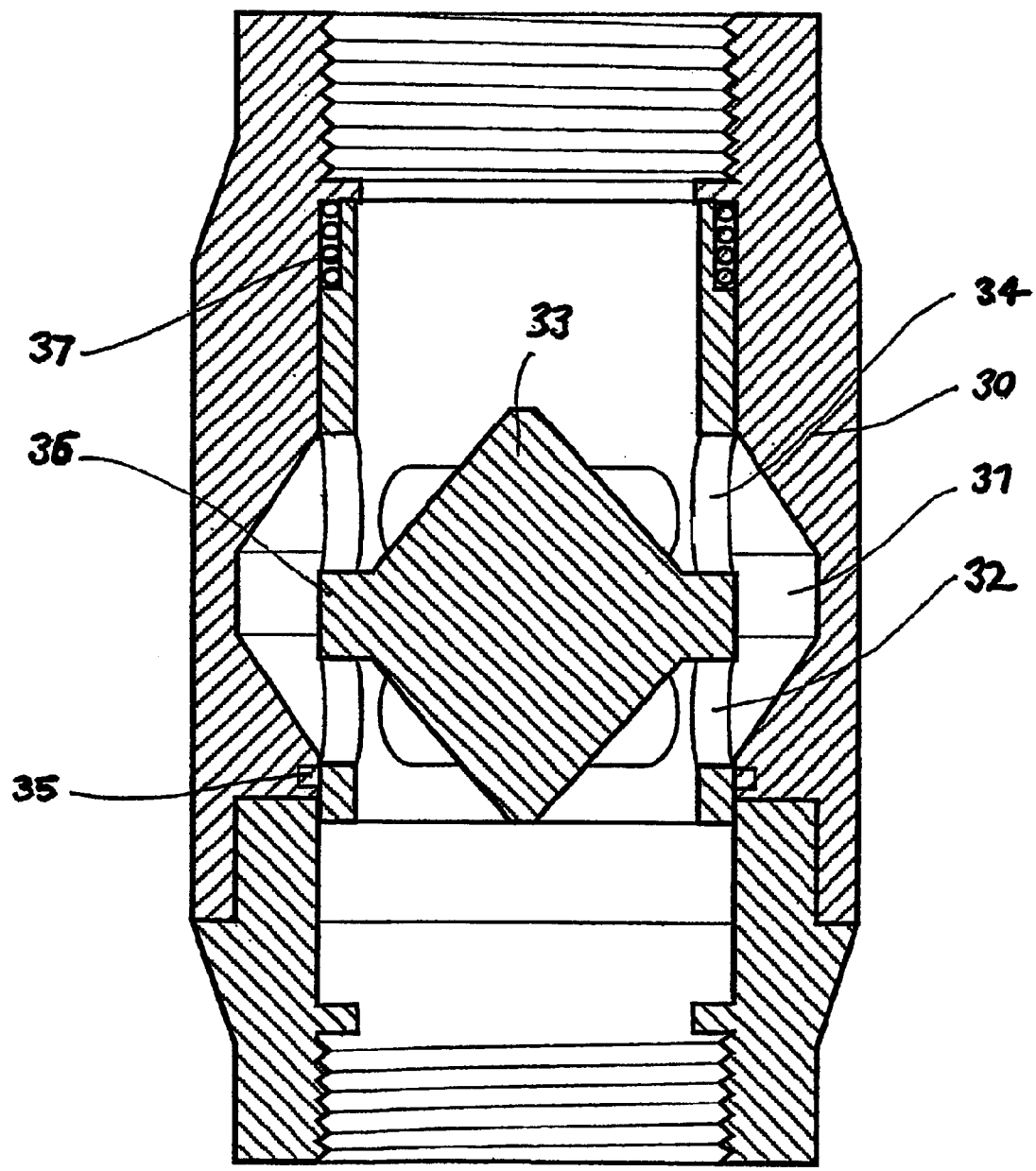
FIG. 7 is the same view as in FIG. 6 of the second embodiment with the shuttle being shown in an open position.

Now referring to the second embodiment, as shown in FIGS. 6 and 7, this is substantially the same as in the first embodiment including a body 30, with a passageway 31 through the body which is able to be accessed by liquid passing through an aperture 32 in the shuttle 33 and reentering into the shuttle area through aperture 34.

The difference here, however, is that the seal is located within the body and is shown at 35 so that the outer surface 36 of the shuttle 33 is simply a bare surface without any additional sealing and will effect a seal only by encountering the seal 35 when in a closed position.

Otherwise, the embodiment is the same with a helical spring 37 biasing the shuttle 33 into a closed position.

In trials conducted so far, this check valve and the improvements would appear to lead to very significant improvements and the reliability available from check valves.

Figure 9:
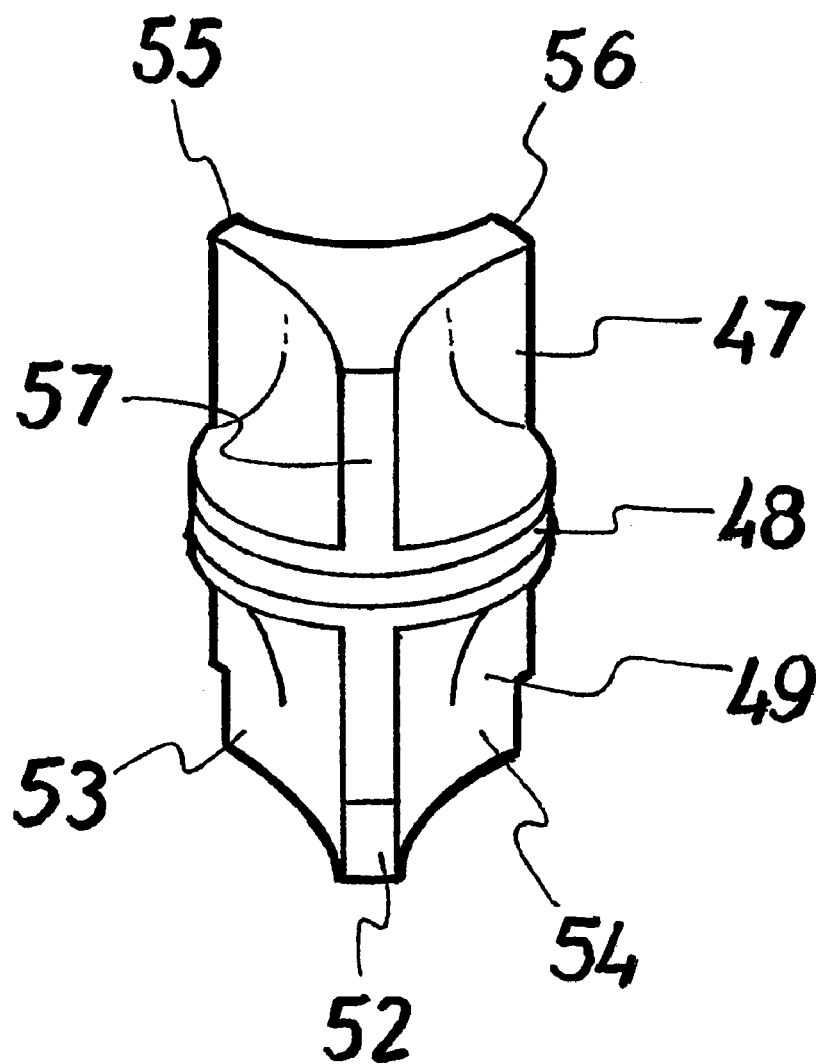
FIG. 9 is a perspective view of a shuttle according to a third embodiment.
Figure 10:
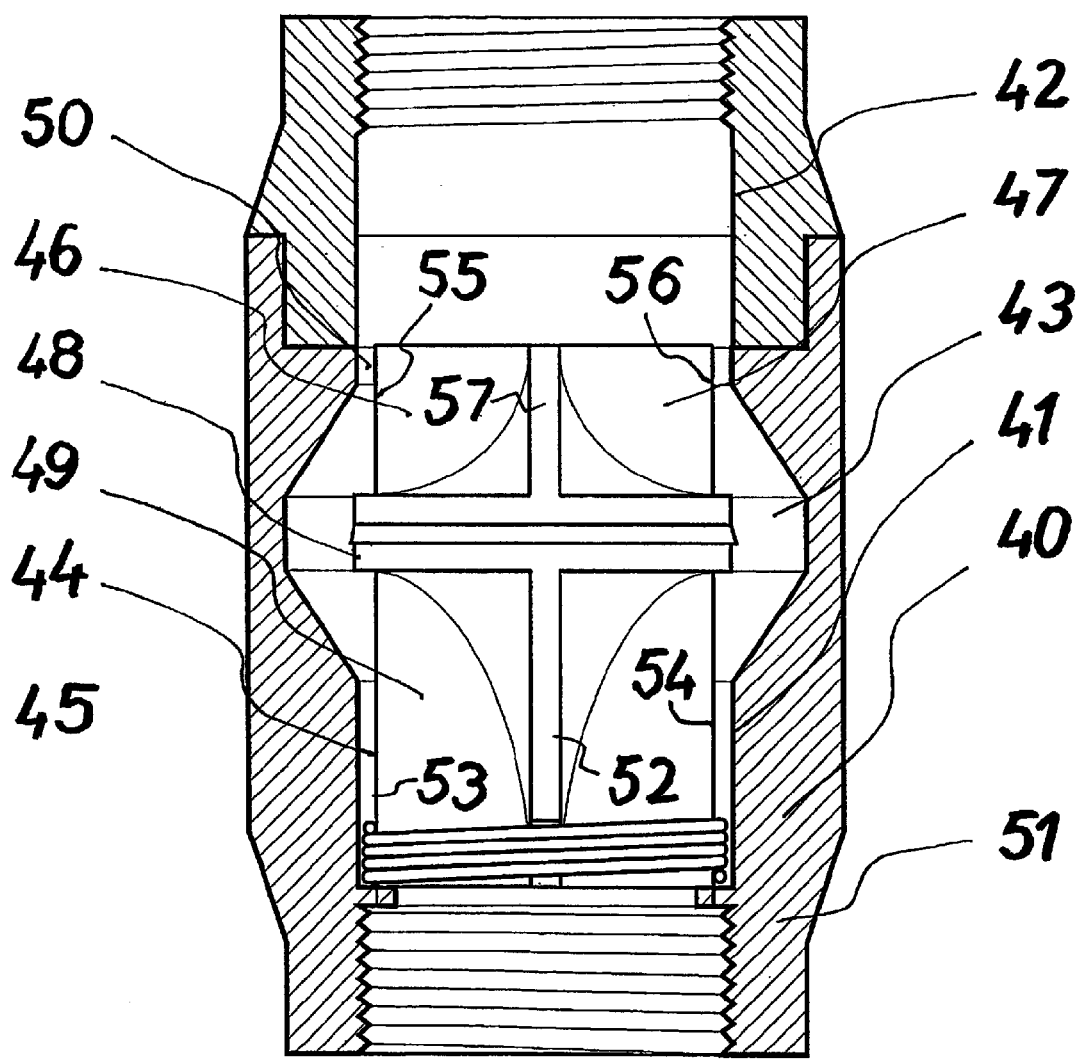
FIG. 10 is a cross sectional view of a valve in an open position according to the third embodiment with the shuttle as in FIG. 9.
Figure 11:
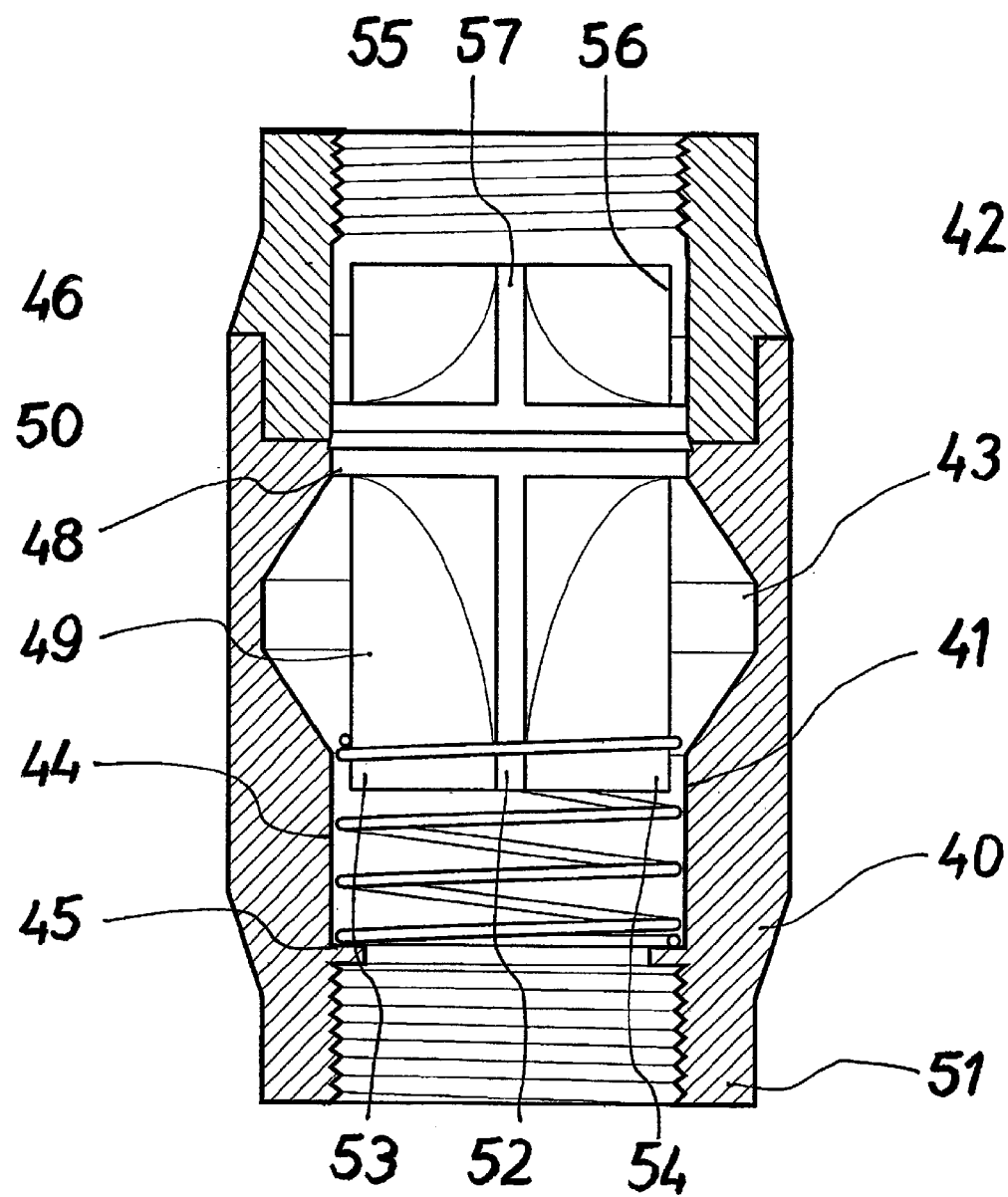
FIG. 11 is a cross sectional view of a valve in a closed position according to the third embodiment with the shuttle as in FIG. 9.

Now referring to FIGS. 9,10 and 11 which describes a third embodiment.

The difference from the first two embodiments is a difference in the upstream and downstream parts of a shuttle.

Specifically the valve in this case has a body 40 which has a downstream portion 41, and upstream portion 42, and a middle portion which has a wider diameter than the other two portions at 43.

There is an endstop 45 limiting the distance the shuttle 46 can move in a downstream direction. The shuttle for 46 has an upstream end portion 47 a middle portion 48 and a downstream portion 49 each of which are engaged with sliding freedom such as to be kept aligned thereby with respect to a cylindrical shape which is defined by the upstream end 42 and the downstream end 41.

The downstream part of the shuttle in this case has three equilaterally aligned wings at 52, 53 and 54. Likewise the upstream end has three wings 55, 56 and 57. In between these wings there is a hollowed shape which includes a smooth transitional curve to direct water therethrough in a way to assist streamlined flow. A significant advantage of this arrangement is that it is easier to manufacture the shuttle by casting. There is also a smaller sliding surface area and to some extent therefore less opportunity for debris to be caught between sliding surfaces.

The general advantages of the invention however remain which is that there is provided a guided alignment of the shuttle between both ends of a sealing central part which will reduce the potential for turbulent chatter. Also, the services are arranged to act in a sliding relationship so as to maintain a cleaning effect between the respective services.

As expressed at the beginning of this document, the problems are very difficult indeed and have not previously appeared to have been addressed effectively.

By use of this check valve and the improvements expressed, significant improvements in reliability and the like of such check valves is now expected and furthermore, when in operation, because of the sliding action described it will be highly unlikely that there will be faulty closing even in the case of very dirty water or other liquid.

Throughout this specification the purpose has been to illustrate the invention and not to limit this.

What is claimed is:

1. A check valve comprising an outer body having an inner bore, and a shuttle arranged within said inner bore to move relative to said inner bore between a closed checking position locking flow of liquid through said check valve, and an open position allowing for a flow of liquid through said check valve, and a resilient means biasing a position of said shuffle toward said closed checking position, wherein said shuttle has a downstream portion, an upstream portion and a middle portion, each portion engaging or engageable with a sliding fit in said inner bore and such that, when in said closed checking position, said middle portion engages with a sealing engagement, said inner bore.

2. The check valve as in claim 1 wherein said shuttle when in an open position allows said flow of liquid to be directed through a passage which first is through a passageway of said shuttle, then through the outer body, and then through the shuttle to an outlet end of the body.

3. A check valve comprising an outer bore having an inner bore and a shuttle arranged within the inner bore to move relative to the inner bore between a closed checking position locking fluid of liquid through the valve, and an open position allowing for flow of liquid through the valve, and a resilient means biasing the position of the shuttle towards said closed position, characterized in that the shuttle has a downstream portion, an upstream portion and a middle portion, each portion engaging or engageable with a sliding fit the bore of the outer body and being such that, when in a closed position, the middle portion engages with a flexible seal, a sealing engagement of the inner bore.

4. A check valve comprising an outer body having an inner bore and a shuttle arranged within the inner bore to move relative to the inner bore between a closed checking position blocking flow of liquid through the valve, and an open position allowing for flow of liquid through the valve, and a resilient means biasing the position of the shuttle towards said closed position, characterized in that the shuttle has a downstream portion, an upstream portion and a middle portion, each portion engaging or engageable with a sliding fit of the inner bore of the outer body and being such that, when in a closed position, the middle portion engages with a flexible seal, the sealing engagement of the inner bore and, when in an open position, arranged that the liquid will flow around the middle portion.

5. A check valve comprising an outer body having an inner bore and a shuffle arranged within the inner bore to move relative to the inner bore between a closed checking position blocking flow of liquid through the valve, and an open position allowing for flow of liquid through the valve, and a resilient means biasing the position of the shuttle toward the said closed position, characterized in that the shuttle has a downstream portion, an upstream portion and a middle portion, each portion engaging or engageable with a sliding fit, the inner bore of the outer body and being such that, when in a closed position, the middle portion engages with a flexible seal, a sealing engagement the inner bore and when in an open position it is arranged that the liquid will flow through a passage around a middle portion which passage includes at least a path through the outer body.

6. A check valve comprising an outer body having a cylindrical inner bore, and a shuttle arranged within the inner bore to move relative to the inner bore, and adapted to move between a closed checking position blocking flow of liquid through the valve, and an open position allowing for the flow of liquid through the valve, and a helical spring comprising resilient means, biasing the position of the shuttle towards said closed position, characterized in that the shuttle has a downstream portion, an upstream portion and a middle portion, each portion engaging or engageable with the sliding fit the inner bore of the outer body and being such that, when in a closed position, the middle portion engages with a flexible seal a sealing engagement the inner bore and when in an open position, it is arranged that the liquid will flow through a passage around the middle portion which passage includes at least a path through the outer body and where the passageway includes a streamline alignment through the shuttle to the path through the outer body.

7. The check valve as in claim 6 wherein said flexible seal is held with the shuttle.

8. The check valve as in claim 7 wherein said shuttle is supported by engaging surfaces which are at an outermost diameter of the shuttle in the case that the shuttle and the bore are of circular cross section or define a circular periphery.

9. The check valve as in claim 6 wherein said flexible seal is held with the outer body.

10. The check valve as in claim 6 wherein said flexible seal is an O-ring.

11. The check valve as in claim 6 wherein said flexible seal is a bucket seal.

12. The check valve as in claim 11 wherein said flexible seal effects a sliding and therefore wiping action between the respective surfaces as it is urged into a closed position with respect to the valve of the body.

* * * * *